United States Patent [19]

Norbäck

[11] 3,738,626

[45] June 12, 1973

[54] DEVICE IN CONTACT BODIES FOR LIQUID AND GAS

[75] Inventor: Per Gunnar Norbäck, Lidingo, Sweden

[73] Assignee: Aktiebolaget Carl Munters, Sollentuna, Sweden

[22] Filed: Mar. 24, 1971

[21] Appl. No.: 127,663

[30] Foreign Application Priority Data
Mar. 26, 1970 Sweden.............................. 4253/70

[52] U.S. Cl. ................................................ 261/112
[51] Int. Cl............................................... B01f 3/04
[58] Field of Search.................................... 261/112

[56] References Cited
UNITED STATES PATENTS

| | | | |
|---|---|---|---|
| 2,986,379 | 5/1961 | Kramig, Jr. ......................... | 261/112 |
| 3,395,903 | 8/1968 | Norback et al..................... | 261/112 |
| 3,450,393 | 6/1969 | Munters............................. | 261/112 |
| 3,451,474 | 6/1969 | Cox.................................... | 261/112 |
| 3,500,615 | 3/1970 | Meek.................................. | 261/94 |
| 3,526,393 | 9/1970 | Meek................................. | 261/112 |

Primary Examiner—Tim R. Miles
Assistant Examiner—Steven H. Markowitz
Attorney—Munson & Fiddler

[57] ABSTRACT

The invention relates to a contact body for liquid and gas, primarily for cooling towers and composed of corrugated layers with the corrugations in adjacent layers forming an angle relative each other and extending at an inclined angle towards a lower liquid discharge edge formed with means to counteract collection of liquid resulting from the combined effect of surface tension in the liquid and the upwardly streaming gas. To improve the discharge flow of the liquid two adjacent layers of the contact body are in pairs at their edges cut obliquely so as together to form an inverted V, viewed in the surface extension of said layers Between each such pair of layers a third layer having a transversely cut lower edge is provided and formed with a prolongation terminating in said transversely cut lower edge and extending for a distance below the layers formed with the obliquely cut edges.

1 Claim, 3 Drawing Figures

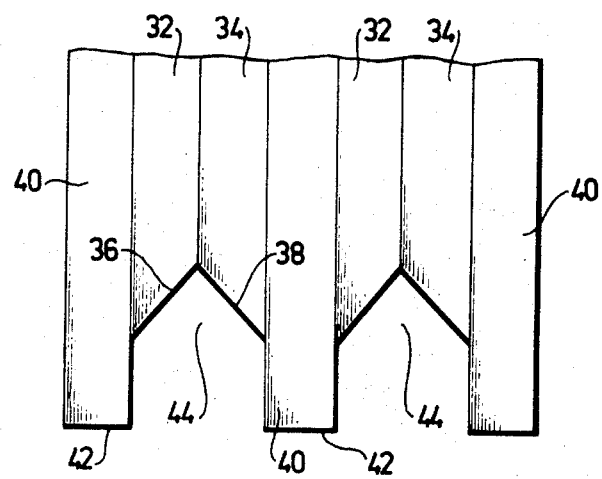
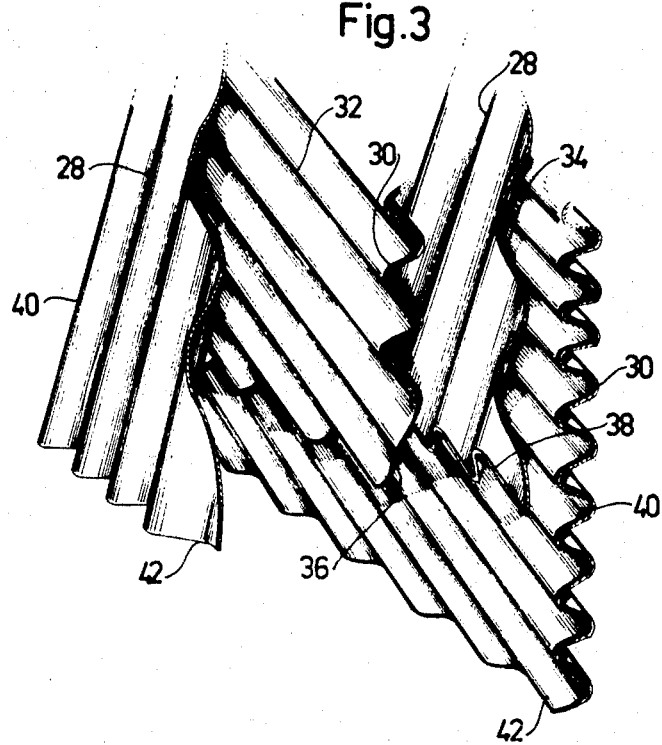

DEVICE IN CONTACT BODIES FOR LIQUID AND GAS

BACKGROUND OF THE INVENTION

This invention relates to a contact body for liquid (water) and gas (air), primarily for cooling towers, said body being composed of corrugated layers, the corrugations of which in adjacent layers form an angle relative each other and extend at an inclined angle towards a lower liquid discharge edge where they are formed so as to counteract collection of liquid due to the combined effect of surface tension and the upwardly streaming gas. A shape of this kind for the lower liquid discharge edge of the contact body or insert is disclosed in, e.g., the U.S. Pat. No. 2,809,818. There are also already known contact bodies or inserts in which all layers are corrugated or folded with folds in adjacent layers crossing one another.

A collection of water in a cooling tower at the lower edge of the contact body or insert, if allowed to develop undisturbed, may result in the channels between the layers being clogged by water in a pulsing manner, said clogging in turn being broken up by the air stream raising from below with the result that the required pressure drop for the advance of the air is highly increased, resulting in an increase of the costs of operation and a lowering of the capacity of the cooling tower. It is possible to reduce such an overbridging by water by increasing the height of the folds or corrugations of the layers, but then the capacity of the contact body or insert within a certain volume is deteriorated in the same degree. At the other hand, modern cooling towers are constructed for steadily increasing air velocities such as 3 to 4 meters per second together with a water quantity of, e.g., 10 to 20 tons per square meter per hour, which implies extremely high requirements on the shape of the liquid discharge edge. It has thus proved that a disturbing overbridging can occur in the structures hitherto used with still so great a height of the folds or corrugations as 20 millimeters.

OBJECT OF THE INVENTION

The main object of the invention is to improve the contact body in said respect.

SUMMARY OF THE INVENTION

According to a main feature of the invention adjacent layers of the contact body of the type in consideration are in pairs at their edges cut obliquely so as together to form an inverted V viewed in the surface extension of the layers and that between each such pair a layer with a transversely cut lower edge is provided, said layer and edge extending downwards for a distance below the layers having the obliquely cut end edges. Hereby sufficiently great open interspaces between the layers are obtained so that the water can not bridge over them but instead is mainly drained off along the extended layers having their downwards projecting, transversely cut edge portions. In addition, the advantage is gained that the extended layers can carry the weight of the contact body when this body rests on relatively narrow supports without becoming damaged or dented.

SHORT DESCRIPTION OF THE DRAWINGS

Further objects and advantages of the invention will become apparent from the following description, considered in connection with the accompanying drawings, which form part of this specification and of which:

FIG. 2 is a diagrammatic view of a portion of the lower part of the contact body viewed in the surface extension of the layers.

FIG. 3 is a perspective view of the lower portion of four layers which for improved clearness are partially cut away.

DETAILED DESCRIPTION OF THE PREFERRED EMBODIMENT

Figure 1:
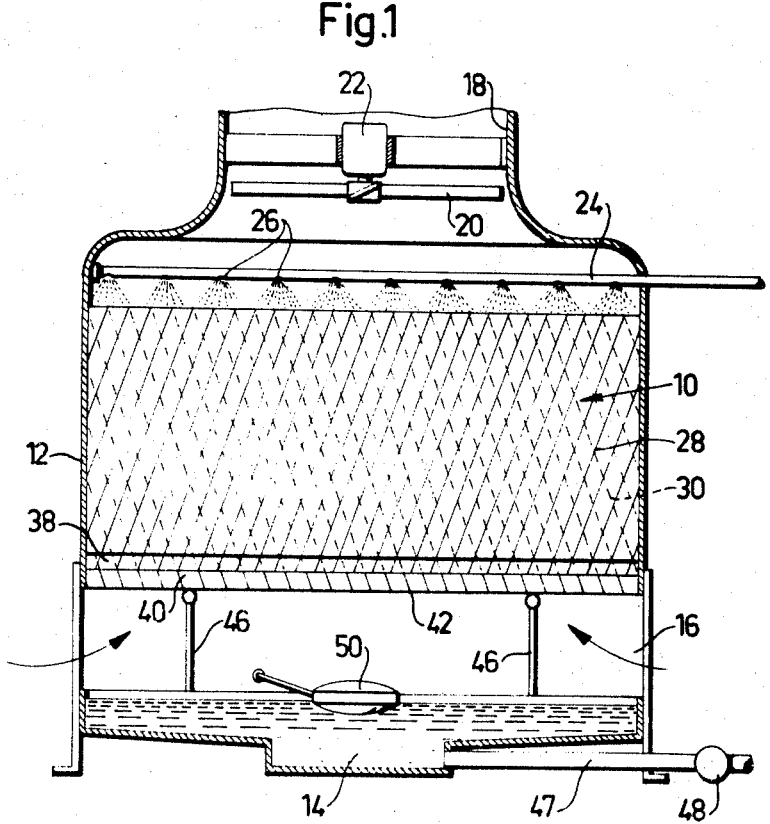
FIG. 1 is a vertical longitudinal sectional view of a cooling tower provided with a contact body made according to the invention.

In the embodiment illustrated in the drawings a contact body or insert 10 is encased by a casing 12 which at the bottom forms a water collecting basin 14. Below the contact body the casing is formed with openings or apertures 16 for admittance of air which passes in upward direction through the contact body 10 and escapes through an outlet 18 within which a fan 20 with a driving motor 22 is provided. Water is supplied to the contact body 10 from above through a distributor 24 having discharge holes 26 formed at its underside.

The contact body 10 consists of thin layers which all are formed with folds or corrugations and placed vertically. The folds or corrugations 28,30 cross one another in adjacent layers with an angle of 45° or less, preferably 25° to 40° relative the vertical plane. The layers abut against one another and are at their points of contact glued together by means of a suitable adhesive. Water and air flow in countercurrent through the contact body 10. Between the layers in the contact body channels or passages extending from end to end are formed in both the horizontal and the vertical directions with continuously varying width from zero at the places of contact between the layers to the double height of the folds or corrugations. The height of the folds or corrugations may be in the range from 5 to 25 millimeters and is preferably from 10 to 15 or 20 millimeters and the width of the channels varies over the entire surface of the layers between zero and the double height of the folds or corrugations.

The layers are preferably made of fibres of cellulose or an inorganic material such as asbestos. Paper layers of cellulose or asbestos become moisture-proof by impregnation with a substance suited to this purpose, e.g., a resin such as phenol resin or melamine resin. The layers may also be made of plastic material.

The layers are according to the invention at their lower edges formed with liquid discharge flaps and therebetween interspaces of such magnitude that also very great quantities of water and velocities of air can be permitted without any risk of plugging the openings of the lower edge, even if the height of the corrugations or folds is relatively little.

For this purpose, adjacent layers 32, 34 are in pairs formed with obliquely cut edges 36 or 38, respectively, said edges facing one another in such a manner as together to form an inverted V. Between each such pair of layers another layer 40 is provided the lower edge 42 of which is cut off transversely with an angle of 90° or an insignificant inclination towards the horizontal plane. In addition, the layers 40 extend for some distance below the lowermost points of the layers 32, 34 and in this way interspaces 44 are formed which are sufficiently wide to permit undisturbed passage of the upwardly streaming air. The water follows at least to its greater portion the obliquely cut flap edges 36, 38 to continue along the extended layers 40.

The contact body 10 is carried by supports 46 (FIG. 1) against which it bears with the horizontal lower edges 42 of the downwards projecting layers 40. These edges are given sufficient supporting capacity to take up the weight of the contact body or insert with water and in some cases ice adhering thereto, for which reason special reinforcements can be dispensed with. Often it is, however, appropriate to provide the end portions of the downwards projecting layers 40 with a coating of a substance such as a plastic material which imparts to the layers increased mechanical strength and toughness.

The cooled water is drawn off from the water collecting basin 14 through a conduit 47 having a valve 48 provided therein, to the place of utilization to be returned to the distributor 24 in a manner known per se. The water level in the collecting basin is controlled by a float 50 so as to cause fresh water to be supplied for replacing losses caused by, e.g., evaporation within the contact body.

While one more or less specific embodiment of the invention has been shown and described, it is to be understood that this is for purpose of illustration only, and that the invention is not to be limited thereby, but its scope is to be determined by the appended claim.

What is claimed is:

1. A contact body for liquid (water) and gas (air), primarily for cooling towers, said body being composed of corrugated layers, the corrugations of which in adjacent layers form an angle relative each other and extend at an inclined angle towards a lower liquid discharge edge where they are formed so as to counteract collection of liquid due to the combined effect of surface tension and the upwardly streaming gas, characterized in that adjacent layers are in pairs at their edges cut obliquely so as together to form an inverted V viewed in the surface extension of the layers and that between each such pair a layer having a transversely cut lower edge is provided, said layer and edge extending downwards for a distance below the layers having the obliquely cut edges.

* * * * *